Patented Dec. 28, 1926.

1,612,675

UNITED STATES PATENT OFFICE.

FERNANDO SOMOZA VIVAS, OF LOS ANGELES, CALIFORNIA, ASSIGNOR TO N. W. STOWELL AND J. H. DOCKWEILER, TRUSTEES.

WATERPROOF AND FIREPROOF SIZING.

No Drawing. Application filed June 14, 1923, Serial No. 645,347. Renewed May 26, 1926.

This invention relates to sizing and has as an object the provision of a sizing which may be applied to canvas or other fabrics or to porous building materials to render the same both water proof and fire proof.

A further object of the invention is the provision of a water proof and fire proof sizing which may be applied to surfaces which are to be painted to render the same non-porous thus reducing the amount of paint required and which will at the same time cause the surface to become fire proof and water proof.

A further object of the invention is the provision of a sizing that is adhesive in nature so that it may be used to join materials in the process of construction, as for instance the layers of wall board while manufacturing the same, so as to at the same time make the finished structure water proof and fire proof.

The formula at present preferred as a physical embodiment of the invention comprises the following ingredients in substantially the proportions named:

| | Parts. |
|---|---|
| Gelatine | 25 |
| Borax | 40 |
| Potash alum | 40 |
| Boric acid | 20 |
| Sodium thiosulfate | 15 |
| Ammonium chloride | 15 |
| Sodium tungstate | 5 |
| Water | 838 |
| Tannic acid | 2 |

The sizing above described may be applied to canvas by brushing the same upon the canvas or by passing the canvas through a bath of the material thus making the canvas both water and fire proof with great enhancement of its value for the making of tents and the like.

The tannic acid in the above formula has the function of so acting upon the gelatine or other organic adhesive which may be used as an equivalent thereof as to make the same insoluble when dry. Other hardening agents may obviously be used for this purpose.

Minor changes may be made in the proportion of parts and equivalents may be used for individual substances in the above formula without departing from the spirit of the invention.

I claim:

1. A sizing, comprising, in combination, a substantial amount each of an organic adhesive, borax, potash alum, boric acid, sodium thiosulfate, ammonium chloride, sodium tungstate, a substance adapted to make the organic adhesive insoluble when dry and water, in suitable proportions to form a sizing which shall be waterproof and fireproof when dried.

2. A sizing, comprising, in combination, a substantial amount each of gelatine, borax, alum, boric acid, sodium thiosulfate, ammonium chloride, a tungstate, tannic acid and water, in suitable proportions to form a sizing which shall be waterproof and fireproof when dried.

3. A sizing, comprising, in combination, a substantial amount each of gelatine, borax, potash alum, boric acid, sodium thiosulfate, ammonium chloride, sodium tungstate, tannic acid and water, in suitable proportions to form a sizing which shall be waterproof and fireproof when dried.

4. A sizing, comprising, in combination, gelatin 25 parts, borax 40 parts, potash alum 40 parts, boric acid 20 parts, sodium thiosulfate 15 parts, ammonium chloride 15 parts, sodium tungstate 5 parts, tannic acid 2 parts, and water 838 parts.

FERNANDO SOMOZA VIVAS.